US005176946A

United States Patent [19]

Wieloch

[11] Patent Number: 5,176,946

[45] Date of Patent: Jan. 5, 1993

[54] LAMINATED CONTACTOR CORE WITH BLIND HOLE

[75] Inventor: Christopher J. Wieloch, Brookfield, Wis.

[73] Assignee: Allen-Bradley Company, Inc., Milwaukee, Wis.

[21] Appl. No.: 698,627

[22] Filed: May 10, 1991

[51] Int. Cl.$^5$ .......................... H01F 27/26; B32B 3/24

[52] U.S. Cl. .................................... 428/138; 428/136; 428/137; 428/139; 428/140; 428/596; 428/457; 428/416; 428/467; 428/497; 428/928; 428/900; 336/219; 336/234; 336/210; 310/217; 310/216; 310/259; 29/598; 29/609

[58] Field of Search ............... 428/136, 137, 138, 139, 428/140, 596, 457, 416, 467, 497, 928, 900; 336/219, 234, 210; 310/217, 216, 259; 29/598, 609

[56] References Cited

U.S. PATENT DOCUMENTS

| | | | |
|---|---|---|---|
| 1,639,456 | 8/1927 | Johnson | 29/609 |
| 2,252,461 | 8/1941 | Franz | 29/609 |
| 2,909,741 | 10/1959 | Arntzen et al. | 336/100 |
| 3,058,039 | 10/1962 | Ray | 317/198 |
| 3,222,626 | 12/1965 | Feinberg et al. | 29/609 |
| 3,304,358 | 2/1967 | De Jean et al. | 264/159 |
| 3,513,527 | 5/1970 | Hoy | 29/609 |
| 3,538,601 | 11/1970 | Nerot et al. | 29/609 |
| 3,813,763 | 6/1974 | Church | 29/596 |
| 4,443,509 | 4/1984 | Sauder | 428/138 |
| 4,494,101 | 1/1985 | Buchschmid et al. | 336/210 |
| 4,882,834 | 11/1989 | Schoen | 29/605 |
| 4,948,656 | 8/1990 | Schoen | 428/215 |

FOREIGN PATENT DOCUMENTS

| | | | |
|---|---|---|---|
| 58-131721 | 8/1983 | Japan | 29/609 |

*Primary Examiner*—Donald J. Loney
*Assistant Examiner*—William P. Watkins, III
*Attorney, Agent, or Firm*—Quarles & Brady

[57] ABSTRACT

A method of manufacturing a core for an electrical inductive device. A blind hole is provided through a stack of laminations into which an oil or an epoxy resin adhesive is placed. The blind hole provides a slow release for the oil to the outer surfaces. This obviates the contamination of the outer surfaces of the coil during manufacture as in the case with a dipping procedure. When the epoxy resin adhesive is employed in the blind hole, a wicking action takes place for better fastening of the laminations together. In another embodiment of the fastening feature, epoxy resin adhesive is molded to the outside of the end piece laminations as well as through a passage in the laminations. An improved resulting core is also provided.

3 Claims, 2 Drawing Sheets

LAMINATED CONTACTOR CORE WITH BLIND HOLE

BACKGROUND OF THE INVENTION

The field of the invention is laminated electromagnetic actuators for electrical equipment, and particularly, laminated contactor and relay cores which can be internally lubricated or secured together.

A typical application of the laminated, metallic contactor cores of this invention is in a motor starter which preferably has two U-shaped cores around which coils of an electromagnet are wound. One core remains stationary and is referred to as a yoke, while the other is moveable and is called an armature. The two laminated cores are attracted to each other when electric power is applied to the coils so that the ends of their legs strike each other. The surfaces at the ends of these legs are preferably ground smooth to reduce vibration of the cores in the closed state. Repeated activation of the starter causes the laminations to shift slightly and also wears the surfaces of contact between the two cores. The wearing of the surfaces exposes bare metal which oxidizes, creating a rough surface ultimately producing vibration and a humming of the starter. To avoid this problem, it is customary to dip the cores in an oil for an extended period of time so that the oil will wick between the laminations. During operation of the device, the oil will seep or wick out of the laminations, coating the contact surfaces and preventing oxidation. A problem arises during manufacture of the cores that are impregnated with oil in that the oil on the outside of the coil during subsequent processing will pick up dust and other contaminants. Also, the amount of oil in the core which is difficult to inspect or accurately control affects the operation of the device.

A prior technique for fastening the laminations together placed metal plates on each side of the outer steel laminations. The assembly is clamped together and riveted. The rivets do not totally fill the holes through the laminations, allowing movement of the laminations which results from the force of repeated operations such as in a motor starter relay.

The prior art recognizes the value of providing the meeting surfaces of the electromagnet with a fine oil film. This is seen in U.S. Pat. No. 3,538,601 which provides a groove formed in conjunction with laminations to hold oil in position an oil film on the ends of the laminations that comes from the reserve between the laminations. In U.S. Pat. Nos. 4,882,834 and 4,948,656 a method and a laminate are disclosed wherein a thin layer of oil is applied by pressure to the laminations.

Concerning the connection of core laminations together, U.S. Pat. No. 3,304,358 shows core laminations and an epoxy resin placed in a passageway in order to hold the laminations together. Wicking action of the epoxy resin between the laminations is also stated.

The prior art does not provide the use of a blind hole in conjunction with the laminations for filling with a oil so as to afford a wicking of the oil from between the laminations and the outer surfaces. Neither does the prior art show the use of a blind hole for the placement of an epoxy adhesive between the laminations or the placement of an epoxy adhesive through a passage in the laminations and in conjunction with end layers for fastening the laminations together.

SUMMARY OF THE INVENTION

The present invention relates to an improved method of manufacturing a core for a electrical inductive device composed of laminations. A plurality of the laminations are stacked, and there is provided at least one blind hole through the stack of laminations, and the blind hole is filled with a viscous liquid such as an oil or epoxy resin adhesive.

In one embodiment, the stacked laminations have an opening in each of the laminations with the openings aligned to form at least one first passageway therethrough. There are placed opposing end pieces in contact with each of the outermost of the laminations. One of the end pieces has an opening to provide a communicating second passageway with the first passageway while the other of the end pieces provides a blind hole with respect to the first passageway. The blind hole is filled with the previously indicated viscous liquid.

In another embodiment, there is provided at least one opening in each of the laminations with the openings aligned to form a passage and filling the passage with a resinous plastic or a low melting point metal and molding end layers of the plastic or lower melting point metal on each of the outermost laminations and continuous with the respective resinous plastic or low melting point metal in the passage.

An improved core for an electrical inductive device resulting from the previously indicated methods is also provided.

A general object of the invention is to provide an improved lubrication method for an electric inductive device.

Another general object of the invention is to provide an improved fastening method for laminations.

A specific object of the invention is to provide for the blind hole filling of a core of laminations with an oil so as to obviate the attraction of dust and other contaminants to the core as well as control the amount of oil applied.

Yet another specific object of the invention is to provide for the blind hole placement and control of epoxy resin adhesive in a core of laminations for fastening purposes.

Still another object of the invention is to provide for the placement of epoxy resin adhesive through a passage in the laminations as well as the formation of end plate portions for fastening purposes.

The foregoing and other objects and advantages of the invention will appear from the following description. In the description reference is made to the accompanying drawing which forms a part hereof, and in which there is shown by way of illustration preferred embodiments of the invention. Such embodiments do not necessarily represent the full scope of the invention, however, and reference is therefore made to the claims herein for interpreting the scope of the invention.

DESCRIPTION OF THE PREFERRED EMBODIMENTS

Figure 1:
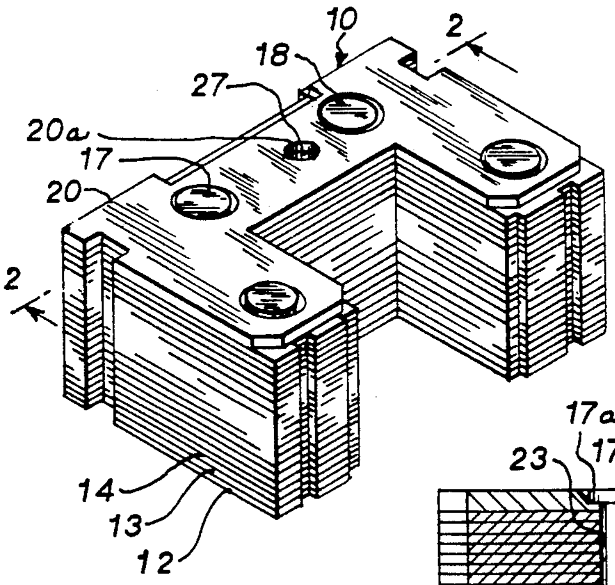
FIG. 1 is a top perspective view showing one of the contactor cores constituting one of the embodiments of this invention.
Figure 2:
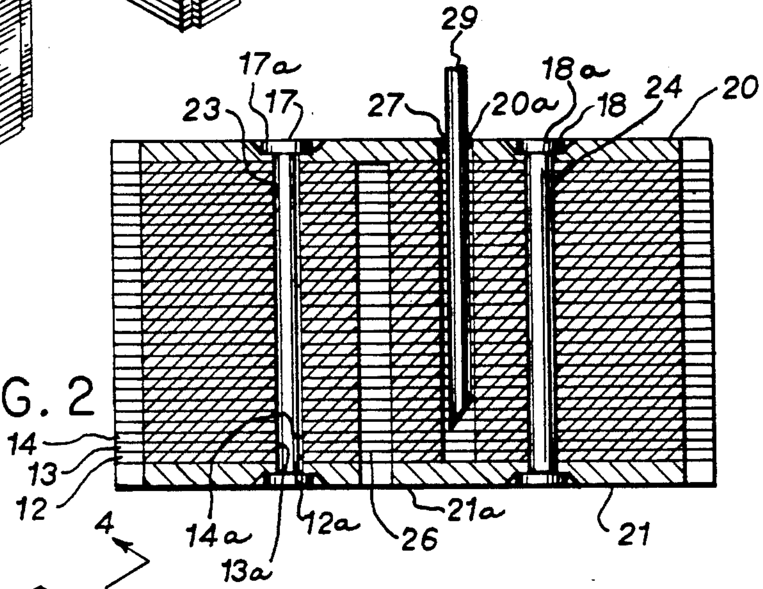
FIG. 2 is a cross sectional view taken along line 2—2 of FIG. 1.

Referring to FIGS. 1 and 2, a core generally 10 is shown with the usual stack of steel laminations as represented by 12, 13 and 14 which are held together by the rivets 17 and 18. The rivets extend through openings in the brass end plates 20 and 21 as well as through, the passages 23 in the laminations. They are secured to the end plates 20 and 21 by swaging the head portions 17*a* and 18*b* in the end plates 20 and 21. In addition to the passages 23 and 24 which extend through all of the laminations such as 12, 13 and 14, there are two additional passageways 26 and 27 which communicate with the respective openings 21*a* and 20*a* in end plates 21 and 20 These are provided by aligned openings such as 12*a*, 13*a* and 14*a* in each of the respective laminations as represented at 12, 13 and 14. It will be seen that these passageways do not extend entirely through both of the end plates 20 and 21, but instead are closed at one end such as with the end plate 20 closing the passageway 26 and the end plate 21 closing the passageway 27. This in effect provides blind holes for passageways 26 and 27.

The purpose of these blind holes is so that they can be filled with a viscous material such as an oil having a viscosity in the range of 50 to 60 centistokes which is normally utilized for lubricating core laminations of an electrical type. The preferred oil is of the synthetic type sold under the brand name NYE 162 by William F. Nye Inc. Alternatively, and where it is desired to secure the laminations together by means of this blind hole feature, a thermosetting epoxy resin adhesive can be introduced which is self curable and/or heat curable. The resin will wick between the surfaces of the lamination and provide a secure fastening feature. The preferred epoxy resin is available from Resiweld Co. under the brand name Resiweld R7107.

The introduction of oil into the blind holes provides a distinct advantage over the previous dipping process in that it allows the oil to gradually wick its way to the external surfaces of the core yet allows the surfaces to be free from oil during subsequent manufacturing steps. Because the oil is viscous and is placed in a blind hole, it will remain in the hole throughout the manufacturing process due to the viscosity of the oil and the external atmospheric pressure. The same is true regarding the use of the epoxy adhesive. The oil or the epoxy resin can be suitably introduced into the blind holes 26 and 27 such as by the filling nozzle 29 which will introduce the oil or the epoxy resin at the lowest part of the blind hole and then be moved upwardly in a slow manner so that entrapment of air is avoided.

Figure 3:
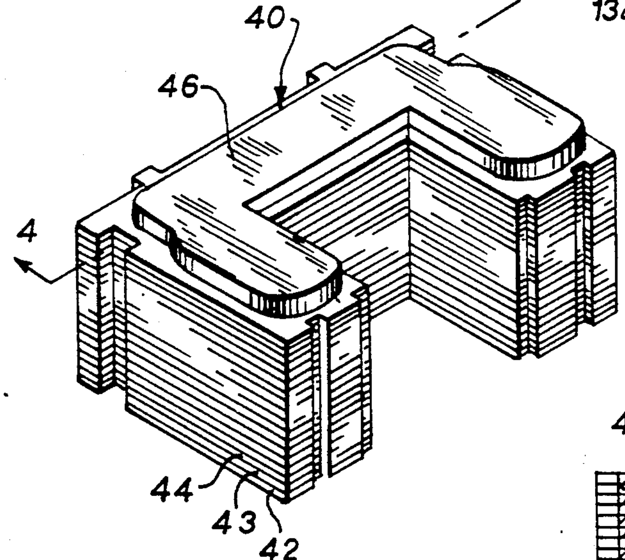
FIG. 3 is a view similar to FIG. 1 showing another core and a further embodiment of the invention.
Figure 4:
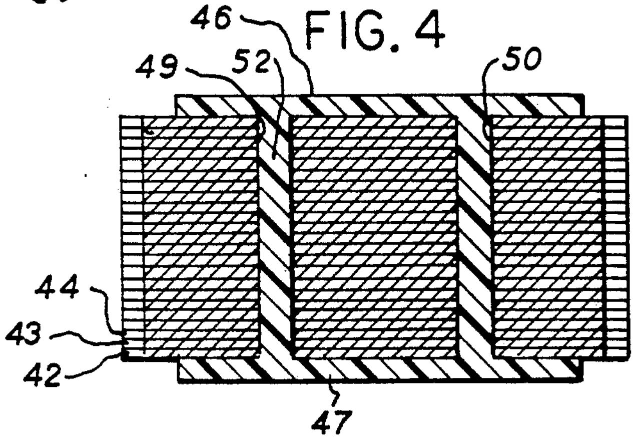
FIG. 4 is a cross sectional view taken along line 4—4 of FIG. 3.

FIGS. 3 and 4 present an alternative core 40 wherein a stack of laminations such as represented by 42, 43 and 44 are secured by the epoxy resin 52 passing through the passages 49 and 50 in the laminations as well as being secured by the end plate portions or layers 46 and 47. The plate portions 46 and 47 are molded together as a one piece unit by means of the epoxy adhesive 52 in the passages 49 and 50. This molding procedure will be described later in conjunction with FIG. 8.

Figure 5:
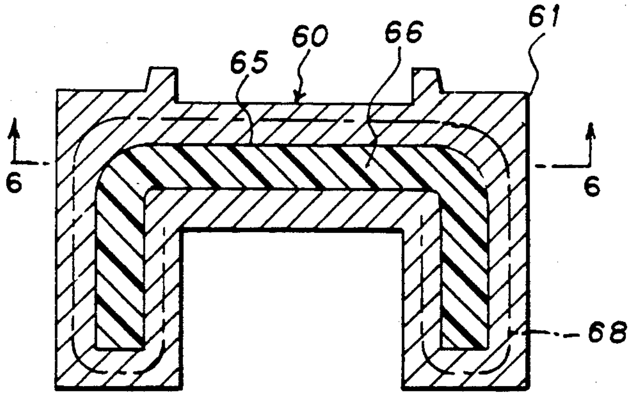
FIG. 5 is a cross sectional view in horizontal section constituting a further embodiment of the invention.
Figure 6:
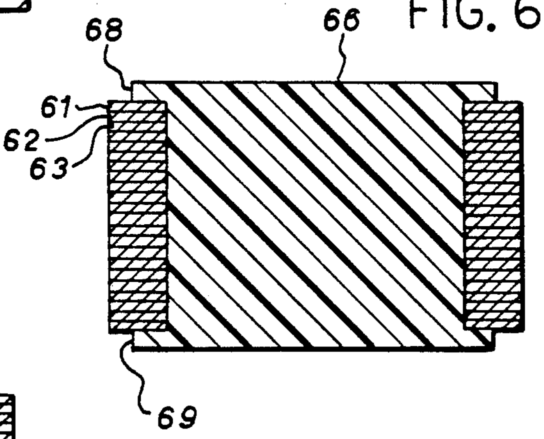
FIG. 6 is a view in cross section taken along line 6—6 of FIG. 5.

FIGS. 5 and 6 show an alternative core 60 which is similar to the core shown generally at 40. Instead of the epoxy resin 66 extending in separate passages such as 49 and 50 in core 40, it is placed into a C shaped slot 65 which will extend through all of the laminations such as 61, 62, and 63 and will be filled with the epoxy adhesive 66 as well as formed as a one piece unit with end plates 68 and 69 similar to end plates 46 and 47 shown in FIG. 4. It will be recognized that the core 60 would have an advantage over the core 40 shown in FIGS. 3 and 4 from a securing standpoint in that a much larger area of the laminations is in contact with the adhesive 66.

Figure 7:
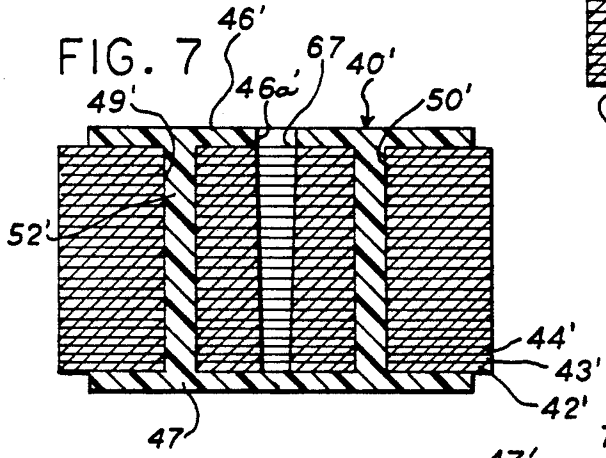
FIG. 7 is a view in vertical section of yet another embodiment of the invention.

The embodiment generally 40' shown in FIG. 7 is similar to that shown in FIGS. 3 and 4 except it has the additional provision of a blind hole passageway 67. All of the components shown in embodiment 40' are the same and are designated with the same numbers except they are primed. It is seen that passageway 67 is open through the end layer 46' such as through the opening 46'*a* but is closed with respect to the end layer 47'. This embodiment 40' offers the advantage of having both the securement and lubricating feature. This is effected by the epoxy adhesive extending through the passages 49' and 50' and connected to the end layers 46' and 47' and the oil which is placed in the blind hole 67.

Figure 8:
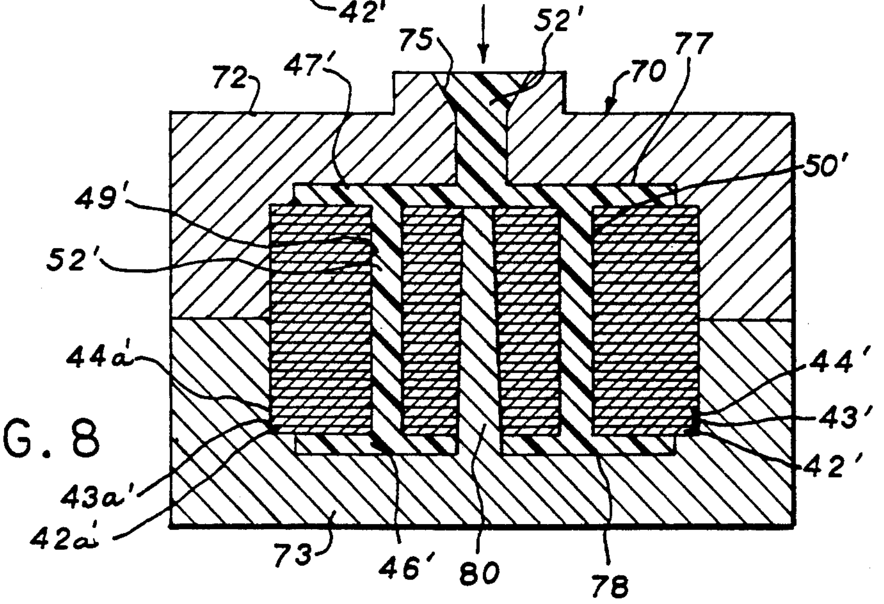
FIG. 8 is a view in cross section showing a molding apparatus for molding together the embodiment shown in FIG. 7.

Referring to FIG. 8, there is shown a mold generally 70 for injection molding epoxy resin 52' in order to form the core embodiment 40' shown in FIG. 7. The laminations such as 42', 43' and 44' are placed in the mold 70 in a stacked h the openings 42'*a*, 43'*a* and 44'*a* in each of the laminations aligned to form the passages such as 49' and 50'. The mold 70 has the usual two mold parts 72 and 73 with a sprue 75 for introducing the epoxy resin 52'. It has the cavities 77 and 78 for forming the end layers 46' and 47'. These cavities will also serve to introduce the epoxy adhesive 52' through the passages 49' and 50' extending through the laminations 42', 43' and 44'. The cavities 77 and 78 will also form the end layers 46 and 47. A tapered plug 80 in the mold extends into the tapered passage 67 so that the molding epoxy plastic will not be introduced therein. When the mold parts 72 and 73 are separated, the passageway 67 will be opened except for it terminating at the layer 47'. This then forms the blind hole 67. It is seen that the mold 70 can also form the core embodiment 40 except that in such instance the laminations would not have the additional passageway 67 for the blind hole, and therefore, the plug feature 80 would not be required.

The core embodiment 10 shown in FIGS. 1 and 2 is depicted with two blind holes 26 and 27. Although not as efficient, it could be formed with a single blind hole such as indicated in the embodiment 40'. It should be pointed out that the end plates 20 and 21 are identical and have the openings 20*a* and 21*a* placed off center and in communication with passageways 27 and 26, respectively. Thus, when the plates are turned end for end and placed at the opposing ends of the core, plate 20 with opening 20*a* is aligned with passageway 26 and opening 21*a* is aligned with passageway 27 in the laminations. However in other areas, they will present a blind surface to the passageways. This arrangement results in a cost savings as only one plate design is required.

Neither is it necessary that the end plates 20 and 21 be present to provide the blind hole feature. Instead, the outermost lamination could provide a barrier surface by having an offset opening as indicated for plates 20 or 21 or by not having an opening therein as in the other laminations.

Any type of viscous oil can be utilized in the blind holes 26 and 27 as long as it has sufficient viscosity so as to be retained in the blind holes during the manufacturing process yet allow a wicking action so that it can wick its way to the external surfaces of the core. While the embodiment 10 has been shown with four rivets interconnecting the laminations and the end plates, it is obvious that any number of rivets can be utilized and still accomplish the advantages of the blind hole feature.

Concerning the core embodiment 40' two passages 49 and 50 are shown which are filled with the epoxy adhesive 52. Any number of such passages could be utilized to interconnect with the end plates 46 and 47. The same is true regarding the number of blind holes, one of which is illustrated at 67 in the embodiment 40'. Any number of blind holes could be provided in this core as well as in core 60. However, with respect to core 60, the blind holes would have to have communication with the laminations 61, 62 and 63 with respect to the epoxy resin 66. It, like the oil, should have a similar viscosity for retention and wicking. While epoxy resin has been described in conjunction with the molding step shown in FIG. 8, any injection moldable resinous plastic or lower melting point metal could be employed in its place such as copper or aluminum.

While the cores shown herein have been preferably in the form of a U shape around which the coils of an electromagnet are wound, they could be of various configurations and still achieve the advantages of the blind hole filling and fastening as described herein. Obviously, the same geometric variations would pertain to the formation of the end plates 20 and 21 and the end layers 46 and 47.

I claim:

1. A core for an electric inductive device comprising:

a stack of a plurality of laminations having top and bottom laminations with said laminations being connected together;

a first opening in each of said laminations, said first openings aligned to form a first passageway through said stack, and a second opening in each of said laminations, said second openings aligned to form a second passageway through said stack;

a first end layer connected to said top lamination and a second end layer connected to said bottom lamination, said end layers being substantially identical and each having an offset opening;

said offset opening of said first end layer being in communication with said first passageway and said offset opening of said second end layer being in communication with said second passageway, said first end layer blocking said second passageway, and said second end layer blocking said first passageway;

said passageways and said end layers forming two blind holes;

said blind holes being filled with a viscous liquid.

2. The core as recited in claim 1 wherein said viscous liquid is an oil.

3. The core as recited in claim 1 wherein said viscous liquid is an epoxy adhesive.

* * * * *